March 3, 1936.                V. H. HURT                 2,032,935
                          RUBBER FILM OR SHEET
                           Filed Nov. 28, 1934
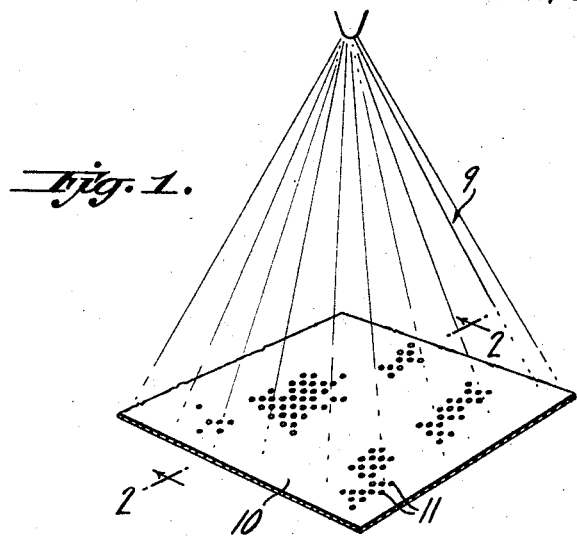
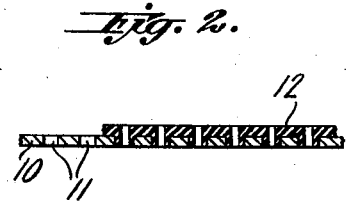
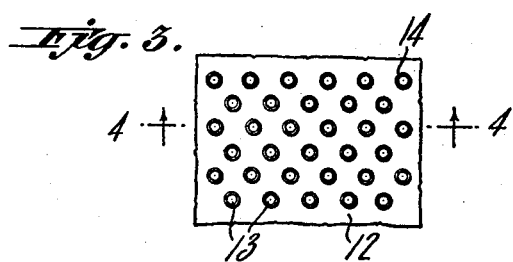
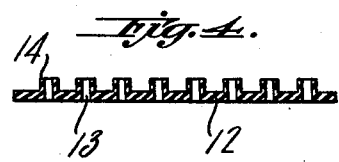
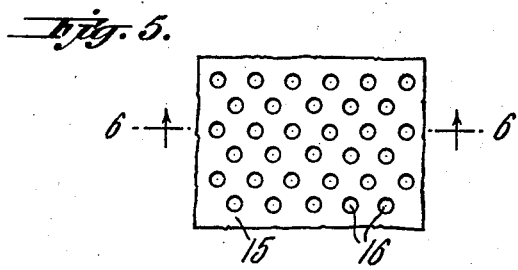
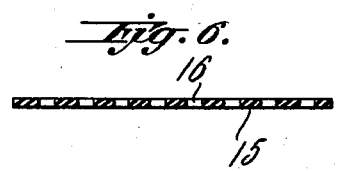
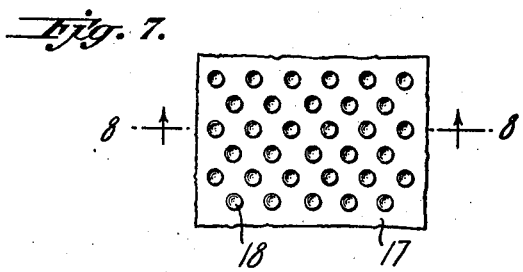
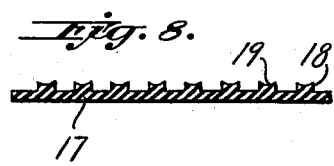
INVENTOR
VICTOR H. HURT
ATTORNEY Patented Mar. 3, 1936

2,032,935

UNITED STATES PATENT OFFICE 2,032,935

RUBBER FILM OR SHEET

Victor H. Hurt, Naugatuck, Conn., assignor to United States Rubber Company, New York, N. Y., a corporation of New Jersey Application November 28, 1934, Serial No. 755,164

7 Claims. (Cl. 18—58)

This invention relates to production of rubber films or sheets and more particularly to rubber films or sheets made directly from latex by spraying methods.

Perforate rubber films or sheets and rubber films or sheets having embossed or raised portions on the surfaces of the same have been made by spreading latex on to a metal backing to dry and when at least partially dried or set impressing a pattern plate on the spread film to form perforations or embossed or raised portions corresponding to the impressions on the plate. Rubber sheetings containing perforations have also been made by spreading latex on a suitably engraved plate, removing the latex from the relief parts of the plate by flowing or by the application of a squeegee, then allowing the latex to dry. Instead of an engraved plate, a mold with suitably spaced projections on the surface has been used. In a similar manner rubber films and sheets with embossed or raised portions on the surface of the same have been made by spreading latex on to a suitably engraved plate or mold so that the latex fills the depressions in the plate or mold and spreads over the relief portions, then allowing the latex to dry and removing a sheet with embossing in the reverse of the engraved plate or mold.

According to the present invention, perforate rubber films or sheets or rubber films or sheets having protuberances on the surface of the same are made by spraying latex on to a perforate deposition backing, in the form of a sheet or any other desired shape, coagulating the latex on the backing preferably by means of a chemical coagulant followed by drying, but if desired by a drying or heating operation alone, and removing the coagulated deposit from the backing. The perforate deposition backing may be of metal, glass, wood or the like and with the portions between the perforations engraved if desired, or the backing may be a fabric such as an open work net or lace fabric. The backing may also be of rubber preferably treated, as by halogenation or oxidation, bromination to form a deposition surface from which coagulated latex deposit may easily be removed. Such a rubber deposition backing may be made directly from a master backing of metal, glass, wood fabric or the like.

Various embodiments of the invention are illustrated in the drawing of which:

Figure 1 illustrates the spraying of latex onto a portion of a perforate metal deposition backing;

Fig. 2 is an enlarged section on the line 2—2 of Fig. 1;

Fig. 3 shows a portion of a perforate rubber sheet with projections at the edges of the perforations, formed by deposition on the backing of Fig. 1;

Fig. 4 is a section on the line 4—4 of Fig. 3;

Fig. 5 illustrates a portion of a perforate rubber sheet produced on the rubber sheet shown in Fig. 3 as a backing, and Fig. 6 is a section on the line 6—6 of Fig. 5;

Fig. 7 shows a portion of a rubber sheet with protuberances on the surface produced on the sheets shown in any of Figs. 1 to 5 as a deposition backing;

Fig. 8 is a section on the line 8—8 of Fig. 7.

It has been found that by spraying latex, with the aid of any number of conventional spray nozzles, on to a perforate deposition backing of the desired shape, and coagulating the latex on the backing, it is possible to produce a large number of valuable products. For example, it is possible to spray a latex of sufficient viscosity on to a perforate deposition backing at a slow enough rate that the spray passes through the perforations without webbing over the same. After coagulation of the latex on the backing, the rubber deposit may be removed in the form of a perforate film or sheet. By applying the latex at a faster rate, as by opening the nozzle or lessening its distance from the backing, or by using a more fluid latex than in making a perforate rubber sheet, the latex may be made to web over and fill the perforations of the backing, providing the perforations are small enough to retain the latex by capillary effect. After coagulating such a sprayed latex deposit on the backing, a film or sheet having protuberances with cup shaped ends on the surface of the same may be removed from the backing, the protuberances corresponding to the positions occupied in the backing by the perforations and the cup shaped ends of the protuberances being formed presumably by virtue of the capillary effect or the coagulation of the latex and removal of water.

In producing perforate rubber films or sheets on a smooth perforated backing, or one having substantially no projections around the edges of the perforations, a film or sheet is formed which itself has projections around the edge of the perforations. This is by virtue of a very thin film of the latex adhering to the inside of the perforations of the backing as the spray particles either are retained on the deposition surface or go through the perforations without webbing over the same. If the spray nozzle is directed at right angles to the deposition surface, as in the preferred method of spraying, the projections will be circumferentially of the perforations in the sheet. If the spray nozzle is directed at an angle to the sheet, the projections will be found to correspond with those portions of the perforations of the deposition base on which the spray impinges. Such projections around the perforations may be of considerable value for example in the manufacture of porous rubber corsets, since a garment made from such a sheet with the projections in the inside of the garment will act to massage the form and enhance the desirable reducing properties of such a garment.

If the surface of the perforate rubber film or sheet is to be embossed between the perforations or if the product is to simulate an open work fabric or the like, then such projections are naturally undesirable. It has been found that when a deposition backing is used which itself has projections then a perforate film or sheet formed on such a backing will be practically free from such projections. This is therefore very advantageous where the backing is engraved, since a rubber sheet or film deposited on such an engraved backing, having projections around the perforations, would itself take the embossing in the reverse of the engraving on the backing, and yet be practically free on its embossed surface from undesirable projections. Likewise, if it is desired to make a film or sheet of rubber simulating open work net or lace fabric, the fabric itself may be used as a deposition backing for the production of a perforate rubber sheeting which would have projections on the edges of the perforations, and also have a surface embossed in the negative of the fabric. Such a rubber sheeting, preferably after treatment with a halogen or an oxidizing agent to make a surface from which the rubber deposit may easily be removed, may itself be used as a deposition backing for the preparation of a perforate sheet material simulating the original fabric and which would be free from projections at the edges of the perforations. When a more fluid latex is used or the latex is applied at a faster rate, than when it is desired to produce a perforate film or sheet, and the perforations on the backing are sufficiently small to retain the latex by virtue of its capillary effect, the film or sheet will be formed with protuberances positioned similarly to the perforations in the backing. Such rubber films or sheets with protuberances on the surface may well be adapted to the manufacture of impervious reducing garments where the protuberances on the inside of the garment act to massage the body and to maintain a film of air between the inside rubber surface of the garment and the body of the wearer. If desired, latex of one color and of a sufficiently high viscosity may be applied to a backing having perforations sufficiently small to retain the latex by virtue of its capillary effect at a sufficiently slow rate that it does not web over the perforations, and subsequently a second latex of a different color more fluid than the first latex or applied at a faster rate may be sprayed on top of the first latex, preferably after coagulation of the first latex, so that the perforations left in the first layer are filled up with the second latex, and the second latex deposit coagulated, and the whole dried. Similarly, a latex of one color may be sprayed on to a perforate backing having perforations of any desired size in such a manner that the latex does not web over the perforations, and thereafter a solid backing may be pressed against the surface of the perforate backing farthest away from the spray nozzle and a latex of a different color from the first applied to the perforate backing to fill up the perforations of the first backing extending to the second solid backing. In such manners, a sheet of one color having protuberances of a different color may be produced. In this manner, rubber labels in two colors may be made using a stencil or the like.

Referring more particularly to the drawing which illustrates in a simple manner, the application of the present invention, Figs. 1 and 2 show the spraying of a latex 9 onto a metal deposition backing in the form of a sheet 10 having perforations 11. Such a backing is merely illustrative of the present invention and may be replaced if desired by perforate backings of various shapes, or perforate engraved backings, or open work fabric materials such as lace or net materials as suggested above. The nozzles and backing may travel or be movable relative to one another, as desired. On spraying a latex of sufficiently high viscosity and at a slow enough rate that the same will not web over the perforations of such a backing, and coagulating the latex deposit by drying or by a chemical coagulation followed by drying, a rubber film or sheet 12 as shown in detail in Figs. 3 and 4 will be formed. The spraying and coagulating operations may be continued alternately until a sheet of the desired thickness is produced. It is preferred, however, to spray the latex onto the backing, following the same with a spray of chemical coagulant such as acetic acid in water, repeating the spraying with latex and then coagulant until the desired thickness has been obtained, and finally drying and removing the film. In practice, such a backing sheet will travel beneath alternate banks of latex and coagulant spray nozzles. If the coagulation is obtained by drying rather than chemical coagulation, so-called heat sensitive latex may be used so that the coagulation of the spray will take place at a faster rate and at a lower temperature than otherwise.

The rubber film or sheet 12, as shown in detail in Figs. 3 and 4, will have perforations 13 with projections 14 at the edges of the same as above described. Such a sheet may be used as a filter, or in garment manufacture as above suggested, or it may be used as a deposition backing, preferably after treatment with a halogen or oxidizing agent, for the preparation of perforate rubber films or sheets free from projections around the perforations. A rubber sheet formed on the sheet 12 of Fig. 3 as a deposition backing is illustrated in Figs. 5 and 6 showing the sheet 15 containing perforations 16 free from the projections corresponding to the projections 14 of the backing 12. It is understood of course that the backing as illustrated in Figures 3 and 4 and having projections around the edges of the perforations need not be a negative produced from such backing as shown in Figs. 1 and 2. It may itself be an original backing made from metal, wood, glass or other material by a molding or other operation. It may readily be seen that the rubber article of Figs. 5 and 6 may, however, be a positive of the backing of Fig. 1, and if the backing of Fig. 1 happens to be a fabric material, for example, the article in Fig. 5 will simulate such a fabric material.

Figs. 7 and 8 show a sheet material produced by spraying on the sheets 10, 12 or 15 of any of the Figs. 1 to 5 as a deposition backing a latex of sufficiently low viscosity and at a sufficiently high rate that it webs over the perforations and fills them, so that when the latex is coagulated and removed from the backing, a sheet 17 is produced having protuberances 18 positioned corresponding to the perforations 11, 13 and 16 of the sheets of Figures 1 and 2, 3 and 4, or 5 and 6 respectively, and having cup shaped end portions 19, as above described.

The term latex in the description and claims is used to designate broadly coagulable dispersions of elastic materials, including artificial dispersions of rubber and rubber-like materials, as well as natural latex, which may be preserved or compounded or otherwise treated as desired and which may be in a normal, diluted, concentrated or purified condition produced by methods well known in the art. If the latex is pre-vulcanized, no vulcanization step is necessary after deposition of the form. If the latex is unvulcanized and contains vulcanizing ingredients, the deposit may be vulcanized on the form or may be removed from the form in an unvulcanized condition and subsequently vulcanized, for example after being made up in the desired article or garment.

With the above detailed disclosure of the invention, it is evident that numerous modifications will disclose themselves to those skilled in the art and it is not desired to limit the invention otherwise than as set forth in the appended claims.

Having thus described my invention what I claim and desire to protect by Letters Patent is:

1. A process for producing a perforate rubber film or sheet comprising spraying onto a perforate deposition backing, a latex of such viscosity and at such a rate that it does not web over the perforations of the backing, coagulating the latex on the backing, and removing the perforate film or sheet from the backing.

2. A process for producing a rubber film or sheet having protuberances with cup-shaped ends on a surface of said film or sheet comprising spraying onto a perforate deposition backing having perforations small enough to retain a liquid therein by the capillary effect of the same, a latex of such viscosity and at such a rate that it webs over and fills the perforations of the backing, the latex being retained therein by its capillary effect, coagulating the latex on the backing, and removing from the backing the film or sheet having protuberances with cup-shaped ends on a surface of said film or sheet.

3. A process for producing a rubber film or sheet having protuberances on a surface thereof and of a different color than said surface comprising spraying onto a perforate deposition backing a latex of one color of such viscosity and at such a rate that it does not web over the perforations of the backing, spraying onto the deposition backing on top of said first latex a second latex of a different color from said first latex and filling the perforations of the deposition backing with said second latex, coagulating the latices on the backing, and removing from the backing the film or sheet having protuberances on a surface thereof.

4. A process for producing a rubber film or sheet having protuberances with cup-shaped ends on a surface of said film or sheet and of a different color than said surface comprising spraying onto a perforate deposition backing having perforations small enough to retain a liquid therein by the capillary effect of the same, a latex of one color of such viscosity and at such a rate that it does not web over the perforations of the backing, spraying onto the deposition backing on top of said first latex a second latex of a different color from said first latex and of such viscosity and at such a rate that said second latex webs over and fills the perforations of the backing, the latex being retained therein by its capillary effect, coagulating the latices on the backing, and removing from the backing the film or sheet having protuberances with cup-shaped ends on a surface of said film or sheet.

5. A film or sheet of the direct solids deposit of latex having protuberances of one color and with cup-shaped ends on a surface of said film or sheet, which surface is of a color different from the color of the protuberances.

6. A process for producing a perforate rubber film or sheet free from projections of rubber at the edges of the perforations thereof comprising spraying onto a perforate deposition backing having projections on the deposition surface at the edges of the perforations thereof a latex of such viscosity and at such a rate that it does not web over the perforations of the backing, coagulating the latex on the backing, and removing the perforate film or sheet from the backing.

7. A process for producing a perforate rubber film or sheet free from projections of rubber at the edges of the perforations comprising spraying onto a perforate deposition backing free from projections on the deposition surface at the edges of the perforations thereof a latex of such viscosity and at such a rate that it does not web over the perforations of the backing, coagulating the latex on the backing, removing the perforate rubber film or sheet having projections at the edges of the perforations thereof from the backing, using the detached rubber film or sheet as a deposition backing negative to the original deposition backing with said projections on the deposition surface thereof, spraying on said negative deposition backing a latex of such viscosity and at such a rate that it does not web over the perforations of the backing, coagulating the latex on the backing, and removing the perforate rubber film or sheet free from projections at the edges of the perforations thereof from the negative backing.

VICTOR H. HURT.